US006587054B2

(12) United States Patent
Besser et al.

(10) Patent No.: US 6,587,054 B2
(45) Date of Patent: Jul. 1, 2003

(54) ELECTRICAL SUBMERSIBLE PUMP CABLE

(75) Inventors: Gordon Lee Besser, Claremore, OK (US); Dick Knox, Claremore, OK (US)

(73) Assignee: Baker Hughes Incorporated, Houston, TX (US)

( * ) Notice: Subject to any disclaimer, the term of this patent is extended or adjusted under 35 U.S.C. 154(b) by 284 days.

(21) Appl. No.: 09/799,291

(22) Filed: Mar. 5, 2001

(65) Prior Publication Data

US 2002/0121987 A1 Sep. 5, 2002

(51) Int. Cl.[7] .................................................. G01V 3/00

(52) U.S. Cl. ................................ 340/854.9; 340/853.3; 340/855.1; 174/103; 174/115; 174/107; 174/113 R; 166/66.4

(58) Field of Search ........................... 340/853.3, 854.9, 340/855.1; 174/115, 103, 107, 113 R; 166/66, 66.4

(56) References Cited

U.S. PATENT DOCUMENTS 4,028,660 A 6/1977 Pitts, Jr.
4,876,539 A 10/1989 Farque
5,086,196 A 2/1992 Brookbank et al.
5,521,592 A 5/1996 Veneruso
6,469,636 B1 * 10/2002 Baird et al. .............. 340/854.9

FOREIGN PATENT DOCUMENTS

DE 3439910 A1 4/1986

* cited by examiner

*Primary Examiner*—Michael Horabik
*Assistant Examiner*—Albert K. Wong
(74) *Attorney, Agent, or Firm*—Bracewell & Patterson, L.L.P.

(57) ABSTRACT

An electrical submersible pump cable having an integral capacitor. The electrical submersible pump cable has a primary conductor with an insulator surrounding the primary conductor. A coaxial conductive layer surrounds the insulator, wherein the insulator serves as a dielectric between the primary conductor and the coaxial conductive layer. An outer insulating sleeve is provided on an outer surface of the coaxial conductive layer. An inner cable armor surrounds the insulating sleeve, wherein the outer insulating sleeve provides electrical isolation between adjacent wires. An outer cable armor surrounds the inner cable armor. The coaxial conductive layer and primary conductor enables the coupling of data information onto or off of the cable.

12 Claims, 2 Drawing Sheets

ELECTRICAL SUBMERSIBLE PUMP CABLE

TECHNICAL FIELD

This invention relates to cables, in particular, to cables for electrical submersible pumps that are manufactured with electrically conductive layers formed coaxially around one or more of the primary conductor insulators to produce one or more capacitors integral to the cable.

BACKGROUND ART

Electrical submersible pump cables typically consist of a plurality of conductors wrapped with armor. Such cables have been used to transmit signals to equipment downhole. In some applications, armor around the cable has been used as a return path for a signal conductor. However, this method is not effective for use with very high frequency signals because the armor offers a high skin resistance as a return path. As a solution, an armored cable described in U.S. Pat. No. 3,916,685 has been implemented. However, the '685 cable is not readily adaptable to tools designed for multi-conductor cables. U.S. Pat. No. 4,028,660 teaches an armored multiconductor coaxial well logging cable for both high frequency signal and low frequency signal transmission in which a plurality of conductors form a shield for an inner conductor. The plurality of conductors are capacitively coupled so that each conductor group may carry a different low frequency signal or direct current voltage. The '660 cable utilizes a coaxial conductor group, wherein each of the conductors within the group are separated from each other by an insulating material. A plurality of capacitors are connected between conductors within a coaxial conductor group. The multi-layer concentric conductors of the '660 patent travel the full length of the cable on high voltage conductors. A signal is transmitted down an inner conductor and power is transmitted down an outer conductor.

Power cables for electrical submersible pumps have been used having an insulated conductor lead shield and wrapped with armor. Lead shields are not electrically insulated from armor or each other. The purpose of the lead shield is is to exclude hydrogen sulfide gas from contact with insulation of conductors.

SUMMARY OF THE INVENTION

The invention includes a specially modified electrical submersible pump cable or specially modified motor lead extension on the cable. The specially modified cable or section has a primary conductor and an insulator that surrounds the primary conductor. A coaxial conductive layer surrounds the insulator. The insulator serves as a dielectric between the primary conductor and the coaxial conductive layer. An outer insulating sleeve is provided on an outer surface of the coaxial conductive layer. An inner cable armor surrounds the insulating sleeve. The outer insulating sleeve provides electrical isolation between adjacent wires. An outer cable armor surrounds the inner cable armor.

The apparatus of the invention enables the coupling of data information onto or off of the primary conductor. Additionally, the invention enables coupling of data information onto or off of the coaxial conductive layer that surrounds the primary conductor. In a preferred embodiment, a motor lead extension is used to provide the capacitance necessary to couple the signal. The motor lead extension is typically 25–35 feet in length, although sufficient capacitance may be obtained in as little as twenty feet of the motor lead extension. The motor lead extension preferably has three conductors of copper surrounded by an insulation. The insulation is preferably polytetrafluoroethylene sold under the trademark TEFLON® for preventing shorting out between the conductors. Wires are inserted into the lead and into downhole instrumentation to transmit high frequency signals to the surface. A current modulator is used downhole to modulate the signal and to send data to the surface. Equipment at the surface monitors high and low frequencies to extract information from the signal. The signal may be routed up two or three phases of the cable. The information can be provided as a differential between two or three phases.

DETAILED DESCRIPTION OF THE INVENTION

Figure 1:
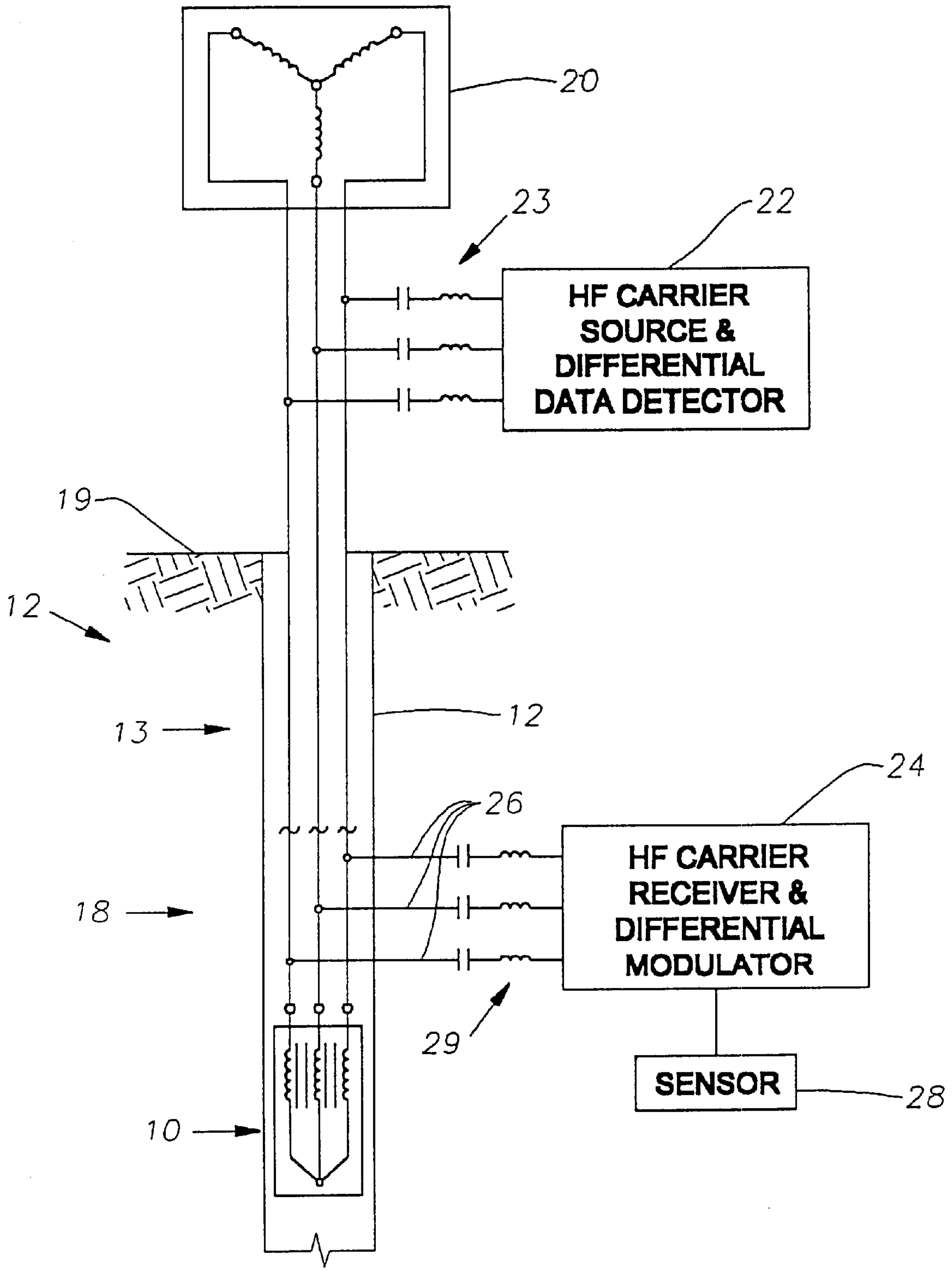
FIG. 1 is a schematic view of the ESP receiving power from a cable having integral capacitors.
Figure 3:
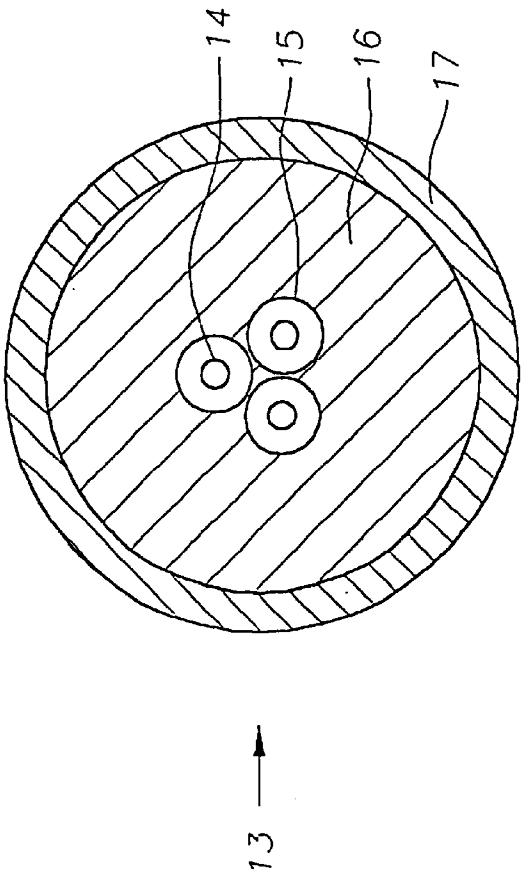
FIG. 3 is a cross-sectional view of a typical round cable.

Referring now to FIG. 1, shown is an electrical schematic of an electrical submersible pump motor (ESP) designated generally 10 in a well 12. The electrical submersible pump motor 10 receives power from a pump cable 13 having a motor lead extension 18 on a lower end thereof. FIG. 3 is a cross-sectional view of a typical round pump cable 13. Pump cable 13 has three conductors 14 surrounded by insulation 15. Conductors 14 and insulation 15 is surrounded by jacket 16, which is surrounded by an armor layer 17.

Typically, a motor lead extension 18 is 25–35 feet long. Motor lead extension 18 is spliced onto cable 13 and is typically constructed of high quality materials to withstand heat from motor 10. It is preferable to specially construct motor lead extension 18 to act as a capacitor rather than to specially construct the entire cable 13 so that a regular cable may be used, thereby reducing cost. Motor lead extension 18 extends upwards from ESP motor 10 and splices into cable 13. Specifically, a first plurality of primary conductors 14 of cable 13 (see FIG. 3) splices to a second plurality of primary conductors 30, 32, 34 of motor lead extension 18 (see FIG. 2). Cable 13 extends upwards to the surface 19, which may be thousands of feet from motor 10. Normally cable 13 will be several thousand feet long.

At surface 19, cable 13 is connected to a three-phase power source 20 and a high frequency carrier source. A differential data detector or surface instrumentation 22 on the surface communicates with cable 13. Preferably, filters 23, shown as a capacitor and inductor, are used to filter out all except high frequency signals generated by surface instrumentation 22. A high frequency carrier receiver and differential modulator or downhole instrumentation 24 is located near motor 10 and is connected via wires 26 to the motor lead extension 18. Downhole instrumentation 24 is in communication with the wires 26 for modulating a signal and for sending data to the surface 19. Additionally, sensor 28 may be provided to deliver information to downhole instrumentation 24. For example, sensor 28 may sense pressure and/or temperature in well 12. Preferably, filters 29 are used to filter out all except high frequency signals generated by surface instrumentation 22. Surface instrumentation 22 monitors high and low frequencies to process the data. Information can be transmitted by creating a differential in the current flowing between phases of pump cable 13.

Figure 2:
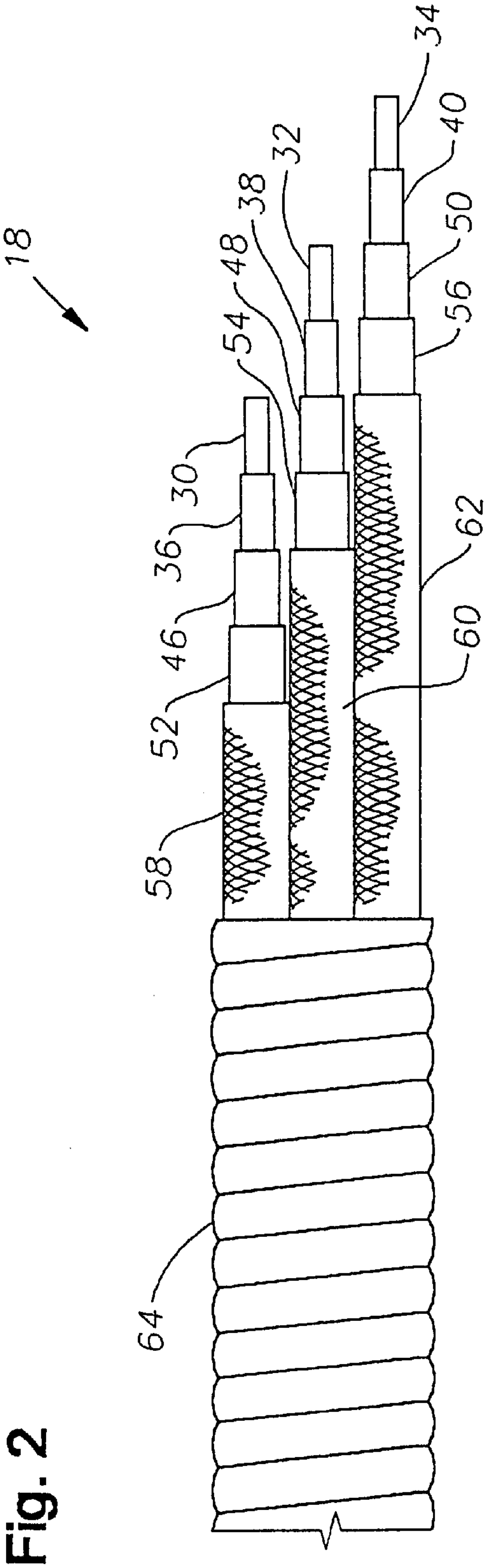
FIG. 2 is a cut-away view of the cable of the invention.

Referring now to FIG. 2, a cut away view of a motor lead extension 18 is shown. Three primary conductors 30, 32 and 34 are made of a conductive material, such as copper. Typically, #4 copper is used, which has a resistance of 0.2485 ohms per 1000' at 20° C. The primary conductors 30, 32 and 34 are preferably coated with insulating material 36, 38 and 40, which is preferably formed of an elastomeric material, such as extruded EPDM, to prevent shorting out between the conductors 36, 38 and 40. A typical thickness of the insulating material 36, 38 and 40 is 45 mil for a cable rated at 4 KV and 55 mil for cable rated at 5 KV. A coaxial conductive layer 46, 48 or 50 surrounds insulators 36, 38 or 40. One or more of primary conductors 30, 32 and 34 may be surrounded by a coaxial conductive layer 46, 48 or 50. However, it is preferred to use at least 2 coaxial conductive layers 46, 48 and/or 50. Coaxial conductive layers 46, 48 and 50 are preferably formed of lead and are surrounded by insulators 52, 54 and 56, which are made of high temperature thermoplastic or thermo set electrical insulation, such as an extruded Fluorinated Ethylene Propylene (FEP) layer, sold under the trademark TEFLON®. The extruded FEP layer is preferably 20 mils in thickness. Coaxial conductive layer 46, 48 and 50 have a resistance of approximately 3 ohms per 1000' at 20° C. Insulators 52, 54 and 56 prevent electrical contact of conductive layers 46, 48 and 50 with each other. Insulating layers 36, 38, and 40 serve as a dielectric between primary conductors 30, 32, and 34 and coaxial conductive layer 46, 48 and 50. Coaxial conductive layers 46, 48 and 50 act as a capacitor plate.

It is preferred to provide just the motor lead extension 18 with coaxial conductive layers 46, 48 and/or 50 and insulators 52, 54 and 56, rather than the entire cable 13. By providing only motor lead extension 18 with the extra co-axial conductive layers 46, 48 and/or 50, regular ESP cable 13 may be used, thereby reducing cost. Regular ESP cable 13 does not have coaxial combination layers. However, special ESP cable 13 may be used to facilitate capacitance if desired. Preferably, motor lead extension 18 is provided with inner cable armor 58, 60 and 62 that surrounds insulators 52, 54 and 56. Inner cable armor 58, 60 and 62 is preferably constructed of a non-conductive braid such as Nylon, Polyvinylidene Flouride sold under the trademark KYNARTM™, or Polyphenylene Sulfide sold under the trademark RYTONTM™, which offers fairly high resistance to electricity. An outer cable armor 64 surrounds inner cable armor 58, 60 and 62 to bundle the individual conductors 30, 32 and 34 together and to protect the bundle. Outer jacket or outer cable armor 64 is preferably a helical wrap of bands of steel. However, other materials may be used for outer jacket 64, including an extruded material such as a high density polyethylene.

In practice, three-phase power is supplied to ESP 10 by power source 20, typically at a frequency of 50/60 Hz. Data from sensor 28 of downhole instrumentation 24 is coupled onto motor lead extension 18. By using the downhole instrumentation 24, the use of large and expensive downhole high voltage capacitors can be avoided. It has been found that capacitance can be obtained in specially modified cable of lengths as short as 12 to 20 feet, therefore, coaxial conductive layers 46, 48 and/or 50 may be provided on just the motor lead extension 18. The electrical submersible pump cable 13 may be used to transmit data information from surface instrumentation 22 to an electrical submersible pump motor 10 by coupling with a capacitor at the surface high frequency data information onto and off of coaxial conductive layers 46, 48 and 50, which surround primary conductors 30, 32 and 34. The preferred frequency range of the data information is 2 KHz to 200 KHz. Filters 23 pass only high frequency signals to the cable 13. High frequency carrier receiver or downhole instrumentation 28 extracts the signal from the motor lead extension 18 via wires 26. The signal is filtered again by filters 29 before reaching downhole instrumentation 24. Information may be passed up motor lead extension 18 and cable 13 by modulating current on selected phases of the cable 13. Surface instrumentation 22 detects differential data from the current modulations.

The invention has several advantages. The advantages include the ability to couple high frequency data information onto or off of the ESP power cable, rather than providing capacitors downhole, which are large and can be difficult and expensive to deploy.

While the invention has been shown in only one of its forms, it should be apparent to those skilled in the art that it is not so limited, but is susceptible to various changes without departing from the scope of the invention.

What is claimed is:

1. A method of supplying power to an ESP and transmitting data information between the ESP and surface comprising the steps of:

providing a pump motor lead with a plurality of first primary conductors, a first inner insulating layer surrounding each of said first primary conductors, a coaxial conductive layer surrounding at least one of said first inner insulating layers, and a first outer insulating layer surrounding each said coaxial conductive layer;

providing a power cable of substantially greater length than the motor lead, and providing the cable with a plurality of second primary conductors, a second inner insulating layer surrounding each of said second primary conductors, a second outer insulating layer surrounding each of said second inner insulating layers, and an armor surrounding said second outer insulating layer, said power cable being free of any conductive layers between said second primary conductors and said armor;

joining said motor lead to said power cable, with said first primary conductors and second primary conductors in electrical continuity with each other;

connecting said motor lead to the ESP and lowering the ESP into a well;

supplying three phase power over said first and second primary conductors to drive the ESP; and coupling high frequency data information onto said motor lead via said coaxial conductive layer and at least one of said first primary conductors; and coupling said high frequency data information off of said cable via at least one of said second primary conductors.

2. The cable according to claim 1 wherein said step of providing a motor lead comprises:

surrounding the first outer insulating layers and the first primary conductors with another armor.

3. The cable according to claim 1 wherein said step of coupling further comprises sensing a characteristic of the well to provide the data information.

4. A method of supplying power to an ESP and transmitting data information between the ESP and surface comprising the steps of:

providing a power cable having a plurality of primary conductors and an armor surrounding the primary conductors;

providing a lower portion of the power cable with a coaxial conductive layer surrounding at least one of the primary conductors, the coaxial conductive layer being insulated from the primary conductors and from the armor, the coaxial conductive layer having a length much shorter than a length of the cable;

connecting the cable to the ESP and lowering the ESP into a well;

supplying three phase power over the primary conductors to drive the ESP; and coupling high frequency data information onto and off of the cable via the coaxial conductive layer and at least one of said primary conductors.

5. The method according to claim 4, wherein said step of coupling further comprises sensing a characteristic of the well to provide the data information.

6. The method according to claim 4, wherein said step of providing a lower portion of the power cable with a coaxial conductive layer comprises surrounding a plurality of the primary conductors with one of the conductive layers.

7. A well pumping and data transmission system, comprising:

a power cable having a plurality of primary conductors and an armor surrounding the primary conductors;

a coaxial conductive layer surrounding at least one of the primary conductors in a lower portion of the cable, the coaxial conductive layer being insulated from the primary conductors and from the armor, the coaxial conductive layer having a length much shorter than a length of the cable;

an ESP located in the well and connected to a lower end of the power cable;

a three phase power source at a surface for supplying three phase power over the primary conductors to drive the ESP;

a sensor in the well for sensing a characteristic of the well;

a high frequency circuit carried by the ESP and connected to the sensor for coupling high frequency data information onto the cable via the coaxial conductive layer and at least one of the primary conductors; and a differential data detector at the surface that is coupled to said at least one of the primary conductors for detecting the detecting the data information.

8. The system according to claim 7 wherein the high frequency circuit comprises:

a differential modulator for modulating a signal between said at least one of the primary conductors and the coaxial conductive layer.

9. A system according to claim 7 wherein the conductive layer is lead.

10. A well pumping and data transmission system, comprising:

pump motor lead having a plurality of first primary conductors, a first inner insulating layer surrounding each of the first primary conductors, a coaxial conductive layer surrounding at least one of the first inner insulating layers, and a first outer insulating layer surrounding the coaxial conductive layer;

a power cable of substantially greater length than the motor lead, the cable having a plurality of second primary conductors, a second inner insulating layer surrounding each of the second primary conductors, a second outer insulating layer surrounding each of the second inner insulating layers, and an armor surrounding the second outer insulating layer, the power cable being free of any conductive layers between the second primary conductors and the armor;

the motor lead being joined to the power cable, with the first primary conductors and second primary conductors in electrical continuity with each other;

an ESP connected to the motor lead and located in the well;

a three-phase power source at a surface for supplying three phase power over the first and second primary conductors to drive the ESP;

a sensor in the well for sensing a characteristic of the well;

a high frequency circuit carried by the ESP and connected to the sensor for coupling high frequency data information onto the cable via the coaxial conductive layer and at least one of the primary conductors; and a differential data detector at the surface that is coupled to said at least one of the primary conductors for detecting the detecting the data information.

11. The system according to claim 12 wherein the high frequency circuit comprises:

a differential modulator for modulating a signal between said at least one of the primary conductors and the coaxial conductive layer.

12. A system according to claim 10 wherein the conductive layer is lead.

* * * * *

UNITED STATES PATENT AND TRADEMARK OFFICE

CERTIFICATE OF CORRECTION

PATENT NO. : 6,587,054 B2
DATED : July 1, 2003
INVENTOR(S) : Gordon Lee Besser et al.

It is certified that error appears in the above-identified patent and that said Letters Patent is hereby corrected as shown below:

Column 4,
Line 45, delete “and” after “ESP;”

Column 6,
Line 5, insert -- a -- before “pump motor”

Signed and Sealed this

Thirtieth Day of September, 2003

JAMES E. ROGAN
*Director of the United States Patent and Trademark Office*